(12) United States Patent  
Rautiainen

(10) Patent No.: US 8,803,697 B2  
(45) Date of Patent: Aug. 12, 2014

(54) DETECTING MOVEMENT FOR DETERMINING CHARACTERISTICS OF USER NOTIFICATION

(75) Inventor: Terhi Rautiainen, Vantaa (FI)

(73) Assignee: Nokia Corporation, Espoo (FI)

( * ) Notice: Subject to any disclaimer, the term of this patent is extended or adjusted under 35 U.S.C. 154(b) by 290 days.

(21) Appl. No.: 13/107,090

(22) Filed: May 13, 2011

(65) Prior Publication Data

US 2012/0286965 A1    Nov. 15, 2012

(51) Int. Cl.
- *G08B 21/00* (2006.01)
- *H04M 1/00* (2006.01)
- *H04M 1/725* (2006.01)
- *H04M 19/04* (2006.01)

(52) U.S. Cl.
CPC .......... *H04M 1/72569* (2013.01); *H04M 19/04* (2013.01); *H04M 2250/12* (2013.01)
USPC .......................................... 340/670; 455/567

(58) Field of Classification Search
None
See application file for complete search history.

(56) References Cited

U.S. PATENT DOCUMENTS

| | | | |
|---|---|---|---|
| 6,408,187 B1 | 6/2002 | Merriam | |
| 6,788,766 B2 * | 9/2004 | Logan | 379/67.1 |
| 7,469,155 B2 | 12/2008 | Chu | |
| 7,853,291 B2 | 12/2010 | Choi | |
| 2003/0151502 A1 * | 8/2003 | Kam | 340/435 |
| 2004/0127198 A1 | 7/2004 | Roskind et al. | |
| 2006/0025120 A1 | 2/2006 | Kuramatsu | |
| 2007/0037605 A1 * | 2/2007 | Logan | 455/567 |
| 2009/0305745 A1 | 12/2009 | Satoh et al. | |
| 2011/0151939 A1 | 6/2011 | Wang | |

OTHER PUBLICATIONS

International Search Report of International Application No. PCT/FI2012/050382—Date of Completion of Search: Jun. 15, 2012, 4 pages.
Written Opinion of the International Searching Authority of International Application No. PCT/FI2012/050382—Date of Completion of Opinion: Jun. 15, 2012, 9 pages.

* cited by examiner

*Primary Examiner* — Brian Zimmerman
*Assistant Examiner* — Cal Eustaquio
(74) *Attorney, Agent, or Firm* — Locke Lord LLP

(57) ABSTRACT

A method, an apparatus and a computer program, where the method includes storing an association between a user notification and an event, detecting the event by an apparatus and detecting movement of an external object in a range outside the apparatus in response to the detected event. Furthermore, the method includes determining characteristics of the user notification based on the step of detecting movement.

18 Claims, 4 Drawing Sheets

DETECTING MOVEMENT FOR DETERMINING CHARACTERISTICS OF USER NOTIFICATION

TECHNICAL FIELD

The present invention generally relates to detecting movement of an external object. The invention relates particularly, though not exclusively, to determining characteristics of a user notification based on the movement detection.

BACKGROUND ART

Modern electronic apparatuses may typically comprise a wide variety of events with different kinds of user notifications. As an example, for an incoming call to a mobile apparatus, a ringing tone typically has a constant volume. From the apparatus settings the ringing tone volume may also be set to increase gradually. Furthermore, the ringing tone may be played a certain pre-selectable time until the call is directed to a voicemail. However, the long ringing of an incoming call that is not answered may cause nuisance, for example in open space office environments or libraries, if the mobile apparatus is left unattended. Also in places like theaters or cinemas, where the apparatus is likely to be in close vicinity of the user, an incoming call may cause considerable disturbance.

The user notifications, for example the ringing tone, and characteristics of the user notifications may be adjusted. The control in such cases is based on the information of the mechanical state or settings of the apparatus and not on the information of the surroundings.

A known solution is related to notifying an incoming call of a voice communication. A ringing tone of the incoming call may be silenced in response to movement of the apparatus or moving a mechanical part of the apparatus. Such mechanical part may be a flip or a slide of an apparatus, for example.

SUMMARY

According to a first example aspect of the invention there is provided a method comprising:
  storing an association between a user notification and an event;
  detecting the event by an apparatus;
  detecting movement of an external object in a range outside the apparatus in response to the detected event; and
  determining characteristics of the user notification based on the step of detecting movement.

According to an example embodiment of the invention, the method may further comprise detecting direction of the movement of the external object. The direction of the movement of the external object may be detected to be one of the following: approaching and moving away.

The event may be selected from a group consisting of:
  an incoming call;
  an incoming mail;
  a received short message;
  a calendar alarm;
  a missed call;
  an unread short message; and
  an updated news feed.

The user notification may be selected from a group consisting of:
  a sound signal;
  a vibration signal;
  a light signal; and
  a text displayed on a display of the apparatus.

Characteristics of the user notification may be selected from a group consisting of:
  a volume of the sound signal;
  a strength of the vibration signal;
  an availability of the light signal; and
  an availability of the text displayed.

According to an example embodiment of the invention, the event is an incoming call to the apparatus, the user notification is a ringing tone, and the characteristic of the user notification is a volume of the ringing tone. Furthermore, the method comprises decreasing the volume of the ringing tone in response to the detected approaching movement of the external object in the range outside the apparatus.

Time for diverting the incoming call to a voicemail of the user may be extended in response to the detected approaching movement of the external object in the range outside the apparatus. Caller identification may be displayed on a display of the apparatus in response to the detected approaching movement of the external object in the range outside the apparatus.

In response to not detecting movement of the external object in the range outside the apparatus, the range for detecting movement may be increased. Furthermore, movement of the apparatus may be detected in response to the detected event and the range outside the apparatus may be determined in response to the detected movement of the apparatus.

According to a second example aspect of the invention there is provided an apparatus comprising:
  a movement detector configured to detect movement of an external object in a range outside the apparatus;
  at least one processor; and
  at least one memory including computer program code, the at least one memory and the computer program code being configured to, with the at least one processor, cause the apparatus at least to perform:
  store an association between a user notification and an event; detect the event;
  detect the movement of the external object in response to the detected event; and
  determine characteristics of the user notification based on the step of detecting movement.

According to a third example aspect of the invention there is provided a computer program embodied on a computer readable medium comprising computer executable program code which, when executed by at least one processor of an apparatus, causes the apparatus to:
  store an association between a user notification and an event; detect the event;
  detect the movement of the external object in response to the detected event; and
  determine characteristics of the user notification based on the step of detecting movement.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1:
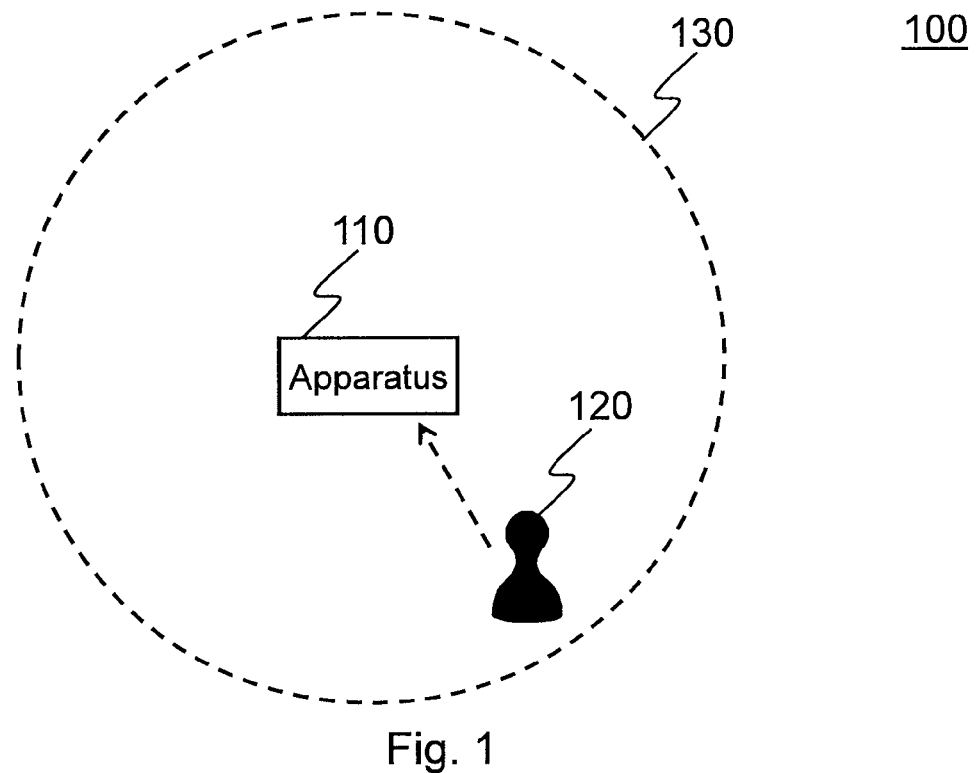
FIG. 1 shows a schematic picture of a system according to an example embodiment of the invention.

FIG. 1 shows a schematic picture of a system 100 according to an example embodiment of the invention. An apparatus 110 belonging to a user 120 comprises different kind of functionalities and applications. Such functionalities and applications may generate a variety of events and a variety of user notifications associated to the events. The events comprise for example incoming calls, incoming text messages, incoming mails, calendar alarms, missed calls, unread text messages or updated news feed. The user notifications comprise different kinds of audio tones, visual effects or a tactile feedback, for example.

The user 120 may occasionally be located in a distance from the apparatus 110. When an event is triggered in the apparatus 110 with a user notification associated to the event, the user 120 typically reacts to the notification. The event of an incoming call with a ringing tone as the user notification is described as an example embodiment.

Following the triggered event and the associated user notification, the apparatus 110 may start detecting movement of external objects outside the apparatus 110. In an embodiment, the movement detection is utilized in a range 130 outside the apparatus 110. No matter the shape of the range 130 in FIG. 1 is oval, the shape may be of any form and not necessarily extending around the apparatus 110 but only to a certain direction from the apparatus 110.

According to an example embodiment of the invention, the apparatus 110 comprises a radar sensor capable of sensing movement in the environment inside the range 130. If the apparatus 110 detects movement of the user 120 inside the range 130, characteristics of the user notification may be determined. In case the apparatus 110 detects the user 120 moving towards the apparatus 110, the characteristics of the user notification may be determined assuming that the user 120 has been reached by the user notification. In the event of an incoming call with the user notification of a ringing tone, the volume of the ringing tone may be decreased in response to the detection of approaching user 120. The volume may be decreased because the user 120 has obviously heard the ringing tone and is approaching the apparatus 110 for answering the call. Furthermore, other user notifications may be determined for the user 120. For example, a display of the apparatus 110 may be turned on and caller identification may be presented on the display for the user 120. If the user 120 is not detected approaching the apparatus 110, such turning on the display and presenting caller identification would be unnecessary.

Figure 2:
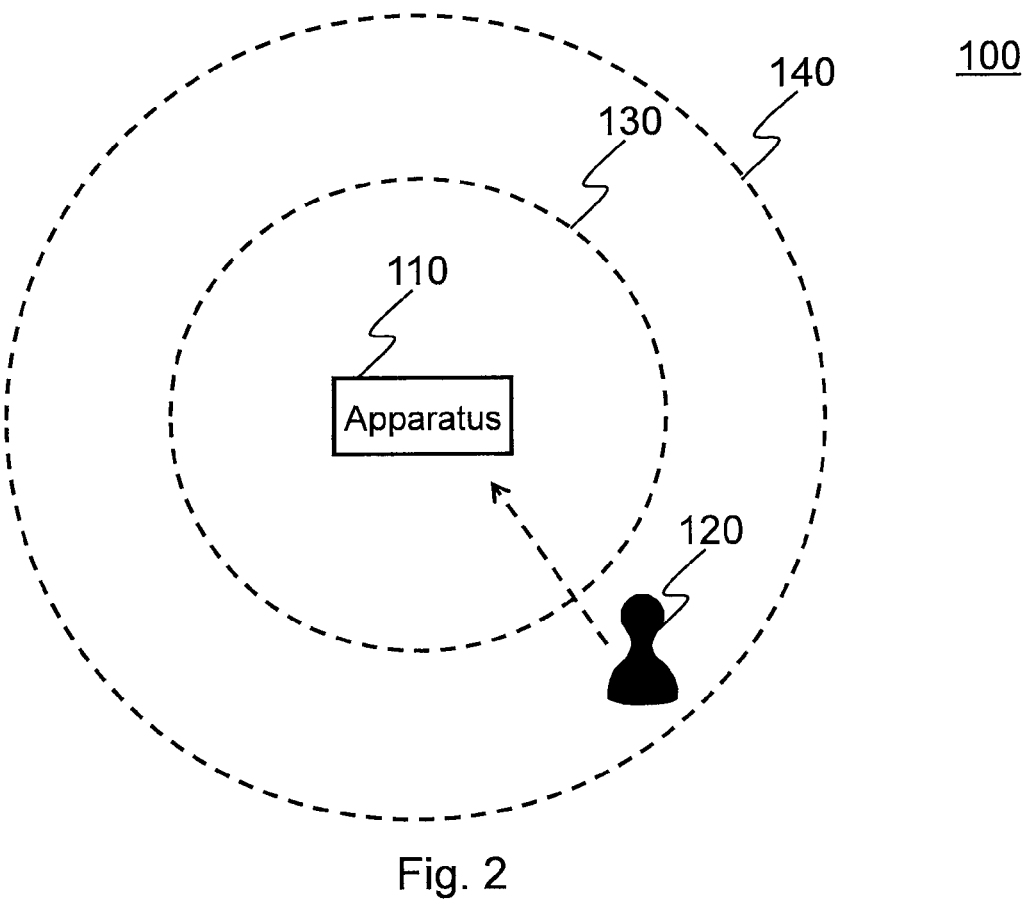
FIG. 2 shows a schematic picture of a system according to another example embodiment of the invention.

FIG. 2 shows a schematic picture of a system 100 according to another example embodiment of the invention. An event associated with a user notification may occur in a similar way as described for FIG. 1. Following the triggered event and the associated user notification, the apparatus 110 may start detecting movement of external objects outside the apparatus 110.

According to an example embodiment of the invention, the apparatus 110 comprises a radar sensor capable of sensing movement in the environment inside the range 130. If the apparatus 110 detects movement of the user 120 inside the range 130, characteristics of the user notification may be determined as described for FIG. 1. However, the user 120 may be located outside the range 130. In response to such detection, further features may be applied. In an embodiment, the range 130 for the radar sensor detecting the movement is increased to an increased range 140. Such increased range 140 enables the detection of the user 120 from a further distance to the apparatus. In case the apparatus 110 detects the user 120 moving towards the apparatus 110, the characteristics of the user notification may be determined assuming that the user 120 has been reached by the user notification. Otherwise the system may be operating as in FIG. 1.

Figure 3:
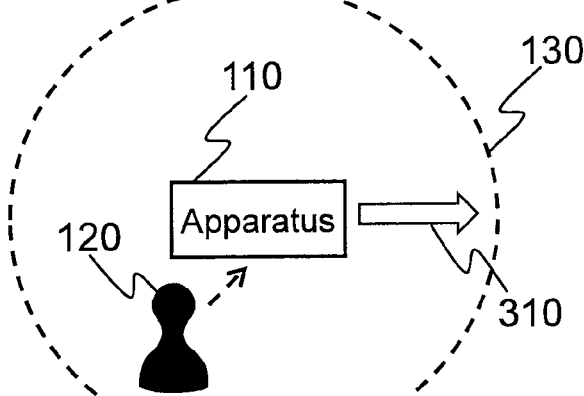
FIG. 3 shows a schematic picture of a system according to another example embodiment of the invention.

FIG. 3 shows a schematic picture of a system 100 according to another example embodiment of the invention. An event associated with a user notification may occur in a similar way as described for FIG. 1. Following the triggered event and the associated user notification, the apparatus 110 may start detecting movement of external objects outside the apparatus 110.

According to an example embodiment of the invention, the apparatus 110 comprises a radar sensor capable of sensing movement in the environment inside the range 130. Additionally, the apparatus 110 comprises a second sensor capable of sensing movement of the apparatus 110. Such second sensor may be for example an accelerometer. In an embodiment, the second sensor is activated simultaneously with the radar sensor. Based on an indication of the apparatus 110 moving to a direction 310, changing its direction, or both, an assumption may be made that the user 120 is nearby the apparatus 110. The user 120 may be walking, driving a car or holding the apparatus in a moving hand, for example. If the apparatus 110 detects movement of the user 120 inside the range 130, characteristics of the user notification is determined as described for FIG. 1. However, if movement of the user 120 is not detected inside the radar range 130, the range 130 needs not to be increased due to the assumption that the user 120 is nearby.

Figure 4:
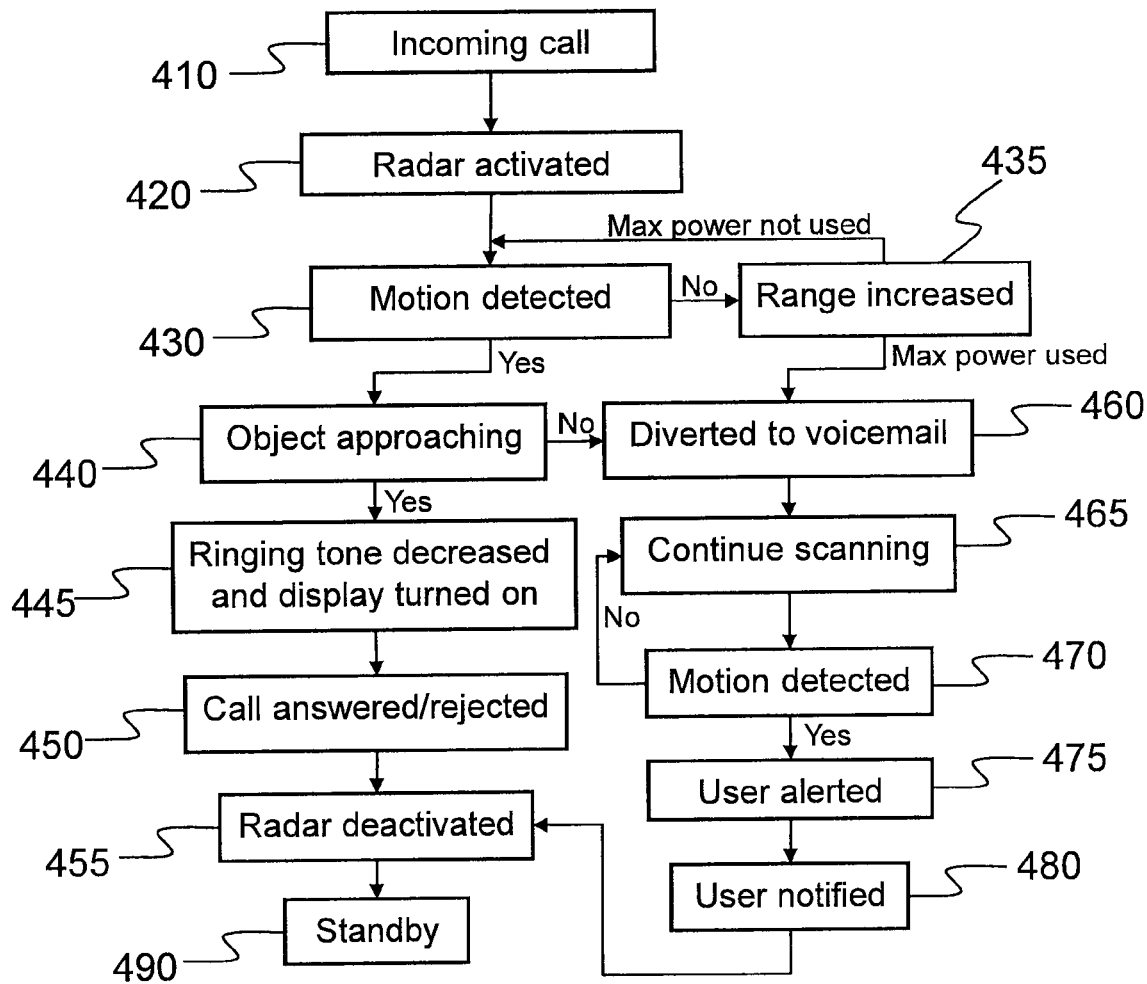
FIG. 4 shows different phases of operations in an apparatus in accordance with an example embodiment of the invention.

FIG. 4 shows different phases of operations in an apparatus in accordance with an example embodiment of the invention. An event of an incoming call 410 is detected in the apparatus and a ringing tone is played for the user. In response to the incoming call 410, a radar sensor is activated 420 for scanning the environment within a certain range. The radar sensor may be a Doppler radar, for example. The radar may be simple but able to detect a moving object outside the apparatus, a velocity of the object and a direction of the object movement (approaching/moving away). A transmission power of the radar basically determines the detection range of the radar: the smaller the power, the shorter the detection range. Initial power of the radar may be fairly small, and if no movement is detected in the immediate vicinity, the transmission power may be increased.

According to an example embodiment of the invention, the radar detects motion 430 in a range outside the apparatus. As described before, the radar may be capable of detecting the direction of the movement as well. In case the radar detects an object approaching 440 the apparatus, the apparatus may assume that the user of the apparatus has notified the ringing tone and is approaching to answer the call. In such a situation the characteristics of the event's user notification may be changed. For example, ringing tone volume may be decreased 445 and a display may be turned on for informing the user of the caller identification. Furthermore, the time for diverting the incoming call to a voicemail may also be extended. Eventually, after the user has reached the apparatus and either answering or rejecting 450 the incoming call, the radar may be deactivated 455.

According to an example embodiment of the invention, the radar may not detect motion in step 430. In such a situation at least two alternatives exist. First, the range of the radar may be increased 435 by increasing the transmission power of the radar. The increasing of the transmission power enables the apparatus to ensure that the user is further away from the apparatus for the earlier radar range but still approaching the apparatus. The transmission power of the radar may be increased until a preset maximum power is reached.

If the radar sensor does not detect motion in the range of the sensor, even with the maximum power, the incoming call may be diverted to the voicemail 460. Such diverting may be triggered even earlier than based on the call settings of the apparatus due to there is no movement detected in the range outside the apparatus. By diverting the call earlier to the voicemail reduces the unnecessary ringing of the apparatus when the user does not seem to be able to answer. Furthermore, power saving is achieved when being able to turn off the display and radio transceiver parts of the apparatus, for example. In an embodiment, diverting the incoming call to the voicemail 460 is resulted even if motion is detected in step 430. In case the detected movement of the possible user is moving away from the apparatus or otherwise not approaching the apparatus, the incoming call may be diverted to the voicemail 460.

According to an example embodiment of the invention, the radar still continues scanning 465 the environment outside the apparatus after diverting the call to the voicemail. However, for power saving purposes the motion sensing may be operated in a pulse mode and the transmission power of the sensor may be adjusted to a reduced range. The detected movement 470 only within a few meters range from the apparatus would trigger a user alert 475 to notify the user about a missed event, such as a call. The user alert 475 may be a sound, a light signal or a vibration, for example. Again, the triggering of user alert 475 in response to the detected motion 470 may reduce the unnecessary user alerting when the user is not in the range of the apparatus and at the same time reduce power consumption of the apparatus. In an embodiment, when no motion is detected in step 470, the apparatus remains silent and stationary. Once the user has been reached by the user alert 475 and the user has been notified 480 of the missed event the radar is deactivated 455. Eventually the apparatus may switch to a normal standby mode 490.

Figure 5:
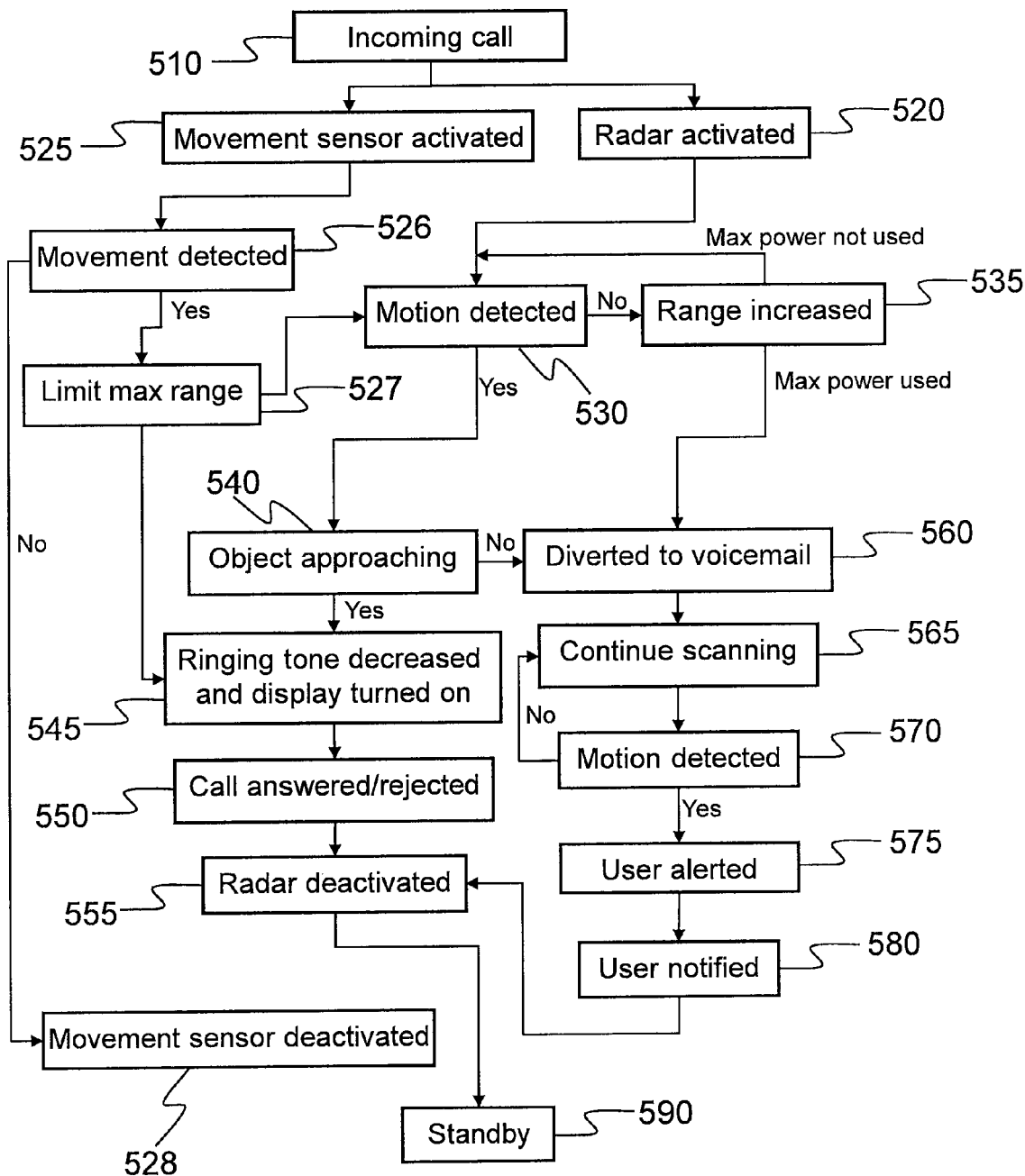
FIG. 5 shows different phases of operations in an apparatus in accordance with another example embodiment of the invention.

FIG. 5 shows different phases of operations in an apparatus in accordance with another example embodiment of the invention. An event of an incoming call 510 is detected in the apparatus and a ringing tone is played for the user. In response to the incoming call 510, a radar sensor is activated 520 for scanning the environment within a certain range. The radar sensor may be a Doppler radar for example. The radar may be simple but able to detect a moving object outside the apparatus, a velocity of the object and a direction of the object movement (approaching/moving away). For a Doppler radar, the transmission power of the radar basically determines the detection range of the radar: the smaller the power, the shorter the detection range. Other radar types may also have other range control mechanisms. Simultaneously with the radar activation 520, a movement sensor may be activated 525. The movement sensor may be an accelerometer, for example. Such movement sensor may determine the movement of the apparatus in relation to the environment, or orientation of the apparatus. Typically the user is moving also in such circumstances, for example walking or driving a car. The user may also hold the apparatus in a moving hand. The movement sensor may be activated 525 to identify the possible movement of the apparatus that may be used in following steps of the embodiment.

Initial power of the radar sensor may be fairly small, and if no movement is detected in the immediate vicinity, the transmission power may be increased. However, if the movement sensor detected that the apparatus is moving in step 526, an assumption of the user being nearby may be made. In such a case, there is no need to increase the radar range 535 and the radar power needs not to be increased necessarily. Only a limited radar range 527 may be utilized to detect whether the user is going to respond to the event of the incoming call, for example. Furthermore, the apparatus may assume that the user of the apparatus has notified the ringing tone and is approaching to answer the call. In such a situation the characteristics of the event's user notification may be changed. For example, the ringing tone volume may be decreased 545 and a display may be turned on for informing the user of the caller identification. In case no movement is detected in step 526, the movement sensor may be deactivated 528 and the range of the radar may be increased 535 by increasing the transmission power of the radar. The increasing of the transmission power enables the apparatus to ensure that the user is further away from the apparatus for the earlier radar range but still approaching the apparatus. The transmission power of the radar may be increased until a preset maximum power is reached.

According to an example embodiment of the invention, the radar detects motion 530 in a range outside the apparatus. As described before, the radar may be capable of detecting the direction of the object movement as well. In case the radar detects an object approaching 540 the apparatus, the apparatus may assume that the user of the apparatus has notified the ringing tone and is approaching to answer the call. In such a situation the characteristics of the event's user notification may be changed. For example, the ringing tone volume may be decreased 545 and a display may be turned on for informing the user of the caller identification. In an embodiment, the movement sensor signal 525 is used for determining the characteristics of the user notification of step 545. The ringing tone volume may be decreased in response to the radar signal 520 indicating an approaching object and the display may be turned on in response to the movement sensor signal 525 indicating a movement, or orientation change, of the apparatus. Such a movement of the apparatus may correspond to the user touching the apparatus. The radar signal may also be used for both purposes, wherein a first radar signal with longer range indicates the user approaching the apparatus and a second radar signal with shorter range indicates the user being already next to the apparatus. As described earlier in the description, the time for diverting the incoming call to a voicemail may also be extended. Eventually, after the user has reached the apparatus and either answering or rejecting 550 the incoming call, the radar may be deactivated in step 555. Also the movement sensor may be deactivated in step 555.

According to an example embodiment of the invention, the radar may not detect motion in step 530. In such a situation at least two alternatives exist. First, the range of the radar may be increased 535 by increasing the transmission power of the radar. The increasing of the transmission power enables the apparatus to ensure that the user is further away from the apparatus for the earlier radar range but still approaching the apparatus. The transmission power of the radar may be increased until a preset maximum power is reached.

If the radar sensor does not detect motion in the range of the sensor, even with the maximum power, the incoming call may be diverted to the voicemail 560. Such diverting may be triggered even earlier than based on the call settings of the apparatus due to there is no movement detected in the range outside the apparatus. By diverting the call earlier to the voicemail reduces the unnecessary ringing of the apparatus when the user does not seem to be able to answer. Furthermore, power saving is achieved when being able to turn off the display and radio transceiver parts of the apparatus, for example. Diverting the incoming call to the voicemail 560 may be resulted even if motion is detected in step 530. In case the detected movement of the possible user is moving away from the apparatus or otherwise not approaching the apparatus, the incoming call may be diverted to the voicemail 560.

In an embodiment, the radar still continues scanning 565 the environment outside the apparatus after diverting the call to the voicemail. However, for power saving purposes the motion sensing may be operated in a pulse mode and the transmission power of the sensor may be adjusted to a reduced range. The detected movement 570 only within a few meters range from the apparatus would trigger a user alert 575 to notify the user about a missed event, such as a call. The user alert 575 may be a sound, a light signal or a vibration, for example. Again, the triggering of user alert 575 in response to the detected motion 570 may reduce the unnecessary user alerting when the user is not in the range of the apparatus and at the same time reduce power consumption of the apparatus. When no motion is detected in step 570, the apparatus may remain silent and stationary. Once the user has been reached by the user alert 575 and the user has been notified 580 of the missed event the radar may be deactivated 555. Eventually the apparatus may switch to a normal standby mode 590.

According to an example embodiment of the invention, characteristics of a user notification of an event are determined in different phases utilizing a radar, a movement sensor or both. A ringing tone may be decreased based on the radar signal indicating an approaching object. A display may be turned on based on the radar signal or the movement sensor indicating the user to be next to the apparatus or even touching it. Notifications of missed events may be alerted for the user based on the radar signal or the movement sensor indicating that the user is in a range to notify the alert. Useless ringing, vibrating or visual effects by the apparatus may be reduced. Correspondingly possible disturbance by the user notifications for other users in close range to the apparatus may be reduced, as well as power consumption due to the unnecessary user notifications.

Figure 6:
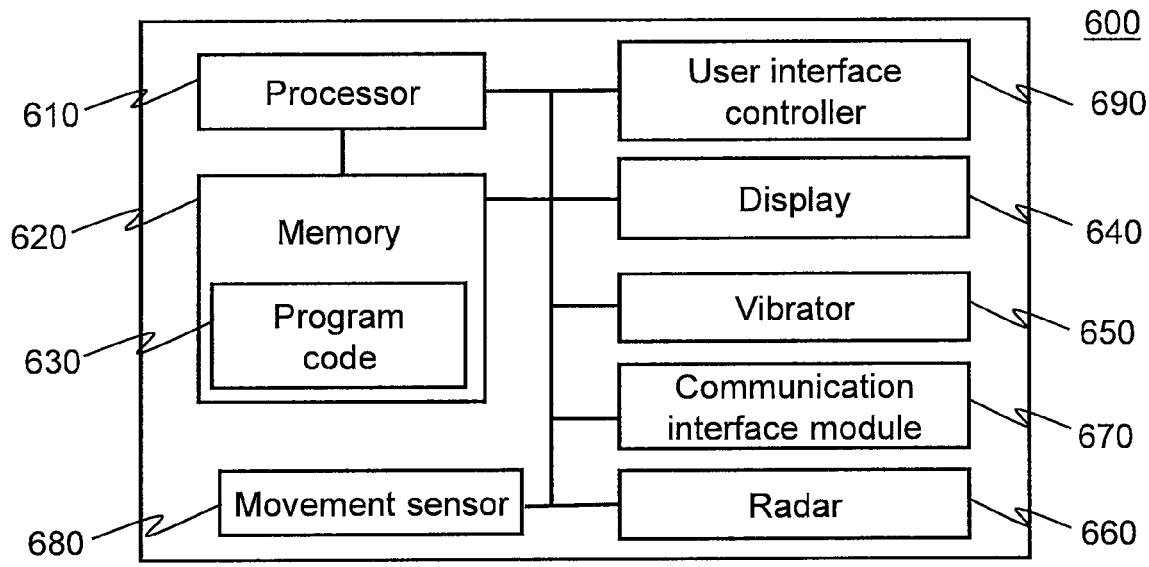
FIG. 6 presents an example block diagram of an apparatus in which various embodiments of the invention may be applied.

FIG. 6 presents an example block diagram of an apparatus 600 in which various embodiments of the invention may be applied. This may be a user equipment (UE), user device or apparatus, such as a mobile terminal or other communication device.

The general structure of the apparatus 600 comprises a display 640, a vibrator 650, a radar 660, a communication interface 670, a movement sensor 680, a processor 610, and a memory 620 coupled to the processor 610. The apparatus 600 further comprises software 630 stored in the memory 620 and operable to be loaded into and executed in the processor 610. In some embodiments, the software 630 comprises one or more software modules and can be in the form of a computer program product. The apparatus 600 may further comprise a user interface controller 690 coupled to the processor 610.

The processor 610 may be, e.g., a central processing unit (CPU), a microprocessor, a digital signal processor (DSP), a graphics processing unit, or the like. FIG. 6 shows one processor 610, but in some embodiments the apparatus 600 comprises a plurality of processors.

The memory 620 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. In some embodiments, the apparatus 600 comprises a plurality of memories. The memory 620 may be constructed as a part of the apparatus 600 or it may be inserted into a slot, port, or the like of the apparatus 600 by a user. The memory 620 may serve the sole purpose of storing data, or it may be constructed as a part of an apparatus serving other purposes, such as processing data.

The communication interface module 670 implements at least part of the user data radio discussed in connection with various embodiments of the invention. The communication interface module 670 may be, e.g., a radio interface module, such as a WLAN, Bluetooth, GSM/GPRS, CDMA, WCDMA, or LTE (Long Term Evolution) radio module. The communication interface module 670 may be integrated into the apparatus 600 or into an adapter, card or the like that may be inserted into a suitable slot or port of the apparatus 600. The communication interface module 670 may support one radio interface technology or a plurality of technologies. FIG. 6 shows one communication interface module 670, but in some embodiments the apparatus 600 comprises a plurality of communication interface modules 670.

The display 640 may be for example a liquid crystal display (LCD) or a light-emitting diode (LED) based display. A touch-sensitive surface may be integrated to the display 640 as a touch display or a touch screen. The touch-sensitive surface may also be included as a separate element, for example as a touchpad.

The radar 660 may be for example a Doppler radar sensor and the movement sensor may be for example an accelerometer or a gyroscope. The radar 660 and the movement sensor 680 may be integrated as a single component or they may be included as separate components. The vibrator 650 may be for example an eccentric motor with vibrating component.

The user interface controller 690 comprises circuitry for receiving input from a user of the apparatus 600, e.g., via a keyboard, graphical user interface shown on the display 640 of the apparatus 600, speech recognition circuitry, or an accessory device, such as a headset, and for providing output to the user via, e.g., a graphical user interface or a loudspeaker.

A skilled person appreciates that in addition to the elements shown in FIG. 6, in some embodiments the apparatus 600 comprises other elements, such as microphones, extra displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 600 comprises a disposable or rechargeable battery (not shown) for powering the apparatus 600 when external power if external power supply is not available.

Figure 7:
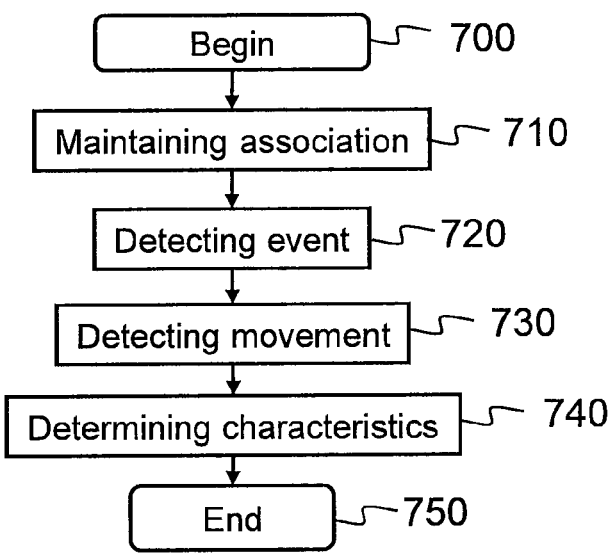
FIG. 7 shows a flow diagram showing capacitive coupling operations in an apparatus in accordance with an example embodiment of the invention.

FIG. 7 shows a flow diagram showing capacitive coupling operations in an apparatus in accordance with an example embodiment of the invention. In step 700, the method is started. In step 710, an association between a user notification and an event is stored. The event is detected by an apparatus in step 720. In step 730, movement of an external object in a range outside the apparatus in response to the detected event is detected. Characteristics of the user notification are determined based on the step of detecting movement in step 740. The method ends in step 750.

Without in any way limiting the scope, interpretation, or application of the claims appearing below, a technical effect of one or more of the example embodiments disclosed herein is that only relevant user notifications are determined. Furthermore, characteristics for the user notifications are provided in such a way that less disturbance to the environment is created and more efficient power saving is achieved for the apparatus due to avoiding unnecessary power consumption.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A method comprising:
storing, in a mobile communications device, an association between a user notification alert and an event occurring at the mobile communications device;
detecting the event by the mobile communications device and triggering the associated user notification alert;
in response to the detecting of the event, detecting by the mobile communications device, using radar, movement of an external object in a range outside the mobile communications device; and
changing characteristics of the user notification alert based on the step of detecting movement.

2. A method of claim 1, further comprising:
detecting direction of the movement of the external object.

3. A method of claim 2, wherein the direction of the movement of the external object is detected to be one of the following: approaching and moving away.

4. A method of claim 1, wherein the event is selected from a group consisting of:
an incoming call;
an incoming mail;
a received short message;
a calendar alarm;
a missed call;
an unread short message; and
an updated news feed.

5. A method of claim 1, wherein the user notification is selected from a group consisting of:
a sound signal;
a vibration signal;
a light signal; and
a text displayed on a display of the apparatus.

6. A method of claim 5, characteristics of the user notification is selected from a group consisting of:
a volume of the sound signal;
a strength of the vibration signal;
an availability of the light signal; and
an availability of the text displayed.

7. A method of claim 1, wherein
the event is an incoming call to the apparatus;
the user notification is a ringing tone;
the characteristics of the user notification is a volume of the ringing tone; and the method further comprising:
decreasing the volume of the ringing tone in response to the detected approaching movement of the external object in the range outside the apparatus.

8. A method of claim 7, further comprising:
extending time for diverting the incoming call to a voicemail of the user in response to the detected approaching movement of the external object in the range outside the apparatus.

9. A method of claim 7, further comprising:
displaying caller identification on a display of the apparatus in response to the detected approaching movement of the external object in the range outside the apparatus.

10. A method of claim 1, further comprising:
in response to not detecting movement of the external object in the range outside the apparatus, increasing the range for detecting movement.

11. A method of claim 1, further comprising:
detecting movement of the apparatus in response to the detected event.

12. A method of claim 11, further comprising:
determining the range outside the apparatus in response to the detected movement of the apparatus.

13. An apparatus comprising:
a movement detector, the movement detector comprising a radar equipped mobile communications device configured to detect movement of an external object in a range outside the mobile communications device;
at least one processor; and
at least one memory including computer program code, the at least one memory and the computer program code being configured to, with the at least one processor, cause the radar equipped mobile communications device at least to perform:
storing an association between a user notification and an event;
detecting the event and triggering the associated user notification;
detecting the movement of the external object in response to the detected event; and changing characteristics of the user notification based on the step of the radar equipped mobile communications device detecting movement of the external object.

14. The apparatus of claim 13, wherein the at least one memory and the computer program code are configured to, with the at least one processor, cause the apparatus to further perform:
   detect direction of the movement of the external object.

15. The apparatus of claim 13, wherein the event is selected from a group consisting of:
   an incoming call;
   an incoming mail;
   a received short message;
   a calendar alarm;
   a missed call;
   an unread short message; and
   an updated news feed.

16. The apparatus of claim 13, wherein the user notification is selected from a group consisting of:
   a sound signal;
   a vibration signal;
   a light signal; and
   a text displayed on a display of the apparatus.

17. The apparatus of claim 16, wherein the characteristics of the user notification is selected from a group consisting of:
   a volume of the sound signal;
   a strength of the vibration signal;
   an availability of the light signal; and
   an availability of the text displayed.

18. A computer program embodied on a non-transitory computer readable medium comprising computer executable program code which, when executed by at least one processor of an apparatus comprising a radar equipped mobile communications device, causes the processor in the radar equipped mobile communication device to:
   store an association between a user notification and a detected event;
   process the detected event and trigger the associated user notification corresponding to the detected event;
   process a detected movement of an external object outside the radar equipped mobile communications device in response to the detected event; and
   change characteristics of the user notification based on the step of processing the detected movement.

* * * * *